United States Patent Office 3,850,869
Patented Nov. 26, 1974

3,850,869
GLASS FIBER SIZING COMPOSITION AND RESULTANT PRODUCT WITH HIGH RESISTANCE TO ABRASION
John Gilbert Mohr, Naumee, Ohio, assignor to Johns-Manville Corporation, Greenwood Village, Colo.
No Drawing. Filed Jan. 2, 1973, Ser. No. 320,025
Int. Cl. C08f 45/24
U.S. Cl. 260—29.6 MN
9 Claims

ABSTRACT OF THE DISCLOSURE

A glass fiber sizing composition comprises a poly(vinyl acetate) film former, polyethylene glycol, a polyester-compatible silane, and a cationic alkyl amide lubricant. The invention also includes the abrasion resistant glass fiber coated with the sizing.

Background of the Invention

This invention relates to production of continuous filament fiber glass strands and particularly relates to a sizing composition which imparts high abrasion resistance to the glass strands.

In postforming molding or handling operations such as rod stock manufacture or weaving of woven roving or cloth, a high rate of abrasion is observed, resulting in undesirable strand filamentation and fuzz clumps in the finished product. It is therefore an object of this invention to develop a sizing composition which can be applied to a glass strand (and the resultant coated product) which will relieve this condition and permit production of coated continuous filament fiber glass strands which are essentially fuzz free.

Brief Summary of the Invention

In one embodiment the invention herein is a sizing composition for glass fiber strands which comprises 0.5 to 15 weight percent of a poly(vinyl acetate) film former, 0.1 to 5 weight percent of a liquid polyethylene glycol, 0.01 to 0.6 weight percent of a polyester compatible silane polymer, 0.01 to 1.0 weight percent methallyl amide reaction product of a $C_1$ to $C_{20}$ alkyl carboxylic acid and an ethylene amine in aqueous medium, said composition having an acidic pH of less than 6. In another embodiment the invention comprises an abrasion resistant continuous filament glass fiber strand coated with said sizing composition.

Detailed Description of the Invention

In one principal embodiment the invention herein comprises a sizing composition which imparts to the glass fiber strands a high resistance to abrasion and permits the production of high quality products from operations such as rod stock manufacture or weaving of woven roving or cloth. The products coated with this sizing composition are highly resistant to strand filamentation and fuzzing.

A major component of the sizing composition is a poly(vinyl acetate) polymer film former. This component may be a pure poly(vinyl acetate) polymer or it may be a poly(vinyl acetate) polymer of commerce which will include certain small amounts of additives such as plasticizers and/or stabilizers. The presence of such commercial additives does not affect the sizing of this composition. The polymer will be present as a homopolymer latex emulsion, having a solids content of 3 to 10 percent. Typical of the polymeric materials suitable is a poly(vinyl acetate) homopolymer latex emulsion commercially available from the Celanese Company under the trade designation "C1-122"; another suitable polymeric material is the poly(vinyl acetate) homopolymer latex emulsion also available from the Celanese Corporation under the trade designation "Celanese 6115." The poly(vinyl acetate) component will be present as from 0.5 to 15 weight percent, and preferably as 1 to 10 weight percent of the composition, measured on a dry basis.

A second component of the sizing composition of this invention is a liquid polyethylene glycol. It is preferred to use a polyethylene glycol which is liquid at ambient temperature, i.e., one that has a molecular weight in the range of from 200 to 600. However, if means are provided for heating the sizing composition, higher molecular weight polyethylene glycols may be used, i.e., those with molecular weights of from 600 to 6,000 and melting points up to about 60° C. The polyethylene glycol component will be present as 0.1 to 5 weight percent, preferably 0.5 to 2.5 weight percent of the sizing composition.

Also present is a polyester compatible silane, preferably a methacrylic silane. The silane serves as a coupling agent to promote greater adhesion between the glass fibers and the resin matrix they are to reinforce. Typical of such materials is a gamma-methacryloxy-propyltrimethoxy silane, commercially available from the Union Carbide Company under the trade designation "A–174." The silane component will be present at 0.01 to 0.6 weight percent, preferably 0.1 to 0.4 weight percent of the composition.

The sizing composition of this invention also contains, as a lubricant, a cationic alkyl amide which is the reaction product of a $C_5$ to $C_{20}$ alkyl carboxylic acid and an ethylene amine, preferably a poly(ethylene amine). The amide will preferably have a methallyl function derived from the carboxylic acid. The alkyl carboxylic acid may be saturated or unsaturated and may be branched or straight chain. It will preferably be an acid containing a $C_5$ to $C_{15}$ straight chain backbone having 0 to 2 sites of unsaturation and 0 to 2 side chains, each side chain containing one or two carbon atoms. Typical examples include oleic acid, pelargonic acid, lauric acid, capric acid, caproic acid, 3-methyl-octanoic acid, 1,2-dimethyl-nonanoic acid and like. The preferred methallyl function may be provided by, for instance, an acid such as 2-methyl-non-2-enoic acid, 2-methyl-dec-2-eonic acid, and 2-methyl-dodec-2-enoic acid. The ethylene amine may be any of ethylene diamine, diethylene triamine, triethylene tetramine, tetraethylene pentamine, pentaethylene hexamine or a similar poly(ethylene amine). Preferred are the poly(ethylene amines) having at least three ethylene groups and four amine groups, i.e., triethylene tetramine or higher. A typical example of the amide is a cationic methallyl amide reaction product of a derivative of pelargonic acid and tetraethylene pentamine, commercially available from Imperial Chemical Industries, Ltd. (Organics Division) under the trade name of "Cirrasol 220." The amide will be present as 0.01 to 1.0 weight percent, preferably 0.1 to 0.5 weight percent of the composition.

The balance of the composition comprises deionized water to make an aqueous solution having up to about 20 to 22 percent solids and a minimum solids content of about 1 percent.

The compositions of this invention will have an acidic pH of not greater than 6, and preferably a pH in the range of 4.0–4.5.

The sizing composition of this invention will be blended and applied in the conventional manner of prior art sizing composition. Ordinarily this involves coating of glass fibers immediately prior to the time at which they are gathered, in groups of 200 to 800 filaments, into strands. This assures a thorough coating of each filament and reduces the abrasion of filaments within each strand and between strands when the latter are gathered into rovings.

As an example of the abrasion resistance of the sizing compositions and coated glass filaments of this invention, application of several sizings of this invention was made to continuous filament fiber glass and compared to similar filaments of fiber glass coated solely with poly(vinyl acetate). The two filaments were then subjected to abrasion resistance tests on standard motorized up and down and back and forth laboratory reed testing devices. The glass fibers coated solely with the poly(vinyl acetate) registered only 2 to 5 minutes resistance while the filaments coated with the sizing of this composition registered abrasion resistance times of from 8.5 to 87 minutes.

The sizing composition of this invention also has the advantage of being highly compatible with the laminating plastics in which the coated fiber glass filaments are placed for reinforcement.

What I claim is:

1. An aqueous glass sizing composition for filament glass fibers which consists essentially of 0.5 to 15 weight percent of poly(vinyl acetate); 0.1 to 5 percent of a polyethylene glycol having a molecular weight in the range of 200 to 6000; 0.01 to 0.6 weight percent of a polyester compatible methacrylic silane; 0.01 to 1.0 percent of a cationic alkyl amide reaction product of a $C_5$ to $C_{20}$ alkyl carboxylic acid and an ethylene amine, and the balance de-ionized water, the composition having a pH of not greater than 6 and a solids content in the range of 1–22 percent.

2. The sizing composition of Claim 1 wherein said polyethylene glycol is a liquid at ambient temperature and has a molecular weight in the range of from 200 to 600.

3. The sizing composition of Claim 1 wherein said methacrylic silane is gamma-methacryloxy-propyltrimethoxysilane.

4. The sizing composition of Claim 1 wherein said amide is the reaction product of an alkyl carboxylic acid having a $C_5$ to $C_{15}$ straight chain backbone containing 0 to 2 sites of unsaturation and having attached thereto 0 to 2 side chains, each side chain containing 1 to 2 carbon atoms, and an ethylene amine containing at least three ethylene groups and four amine groups.

5. The sizing composition of Claim 1 wherein said poly(vinyl acetate) is present as 1 to 10 weight percent, said polyethylene glycol is present as 0.5 to 2.5 weight percent, said silane is present as 0.1 to 0.4 weight percent, and said amide is present as 0.1 to 0.5 weight percent.

6. The sizing composition of Claim 1 wherein said pH is in the range of 4.0 to 4.5.

7. A glass fiber filament having superior abrasion resistance and coated with the sizing composition of Claim 1.

8. A glass fiber filament having superior abrasion resistance and coated with the sizing composition of Claim 5.

9. A glass fiber strand comprising 200 to 800 filaments each coated with the sizing composition of Claim 1.

References Cited
UNITED STATES PATENTS

| | | | |
|---|---|---|---|
| 2,798,020 | 7/1957 | Balz | 260—29.6 ME |
| 3,116,192 | 12/1963 | Eilerman | 260—29.6 MN |
| 3,046,243 | 7/1962 | Santelli | 260—29.6 N |
| 3,249,411 | 5/1966 | McWilliams | 260—29.6 N |

MORRIS LIEBMAN, Primary Examiner

P. R. MICHL, Assistant Examiner

U.S. Cl. X.R.

117—126 GB, 126 GS; 260—29.6 ME